United States Patent
Asati et al.

(10) Patent No.: US 8,918,531 B2
(45) Date of Patent: Dec. 23, 2014

(54) AUTOMATED NETWORK DEVICE PROVISIONING USING DYNAMIC HOST CONFIGURATION PROTOCOL

(75) Inventors: Rajiv Asati, Morrisville, NC (US); Ralph Droms, Westford, MA (US); Vijay Bollapragada, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 1070 days.

(21) Appl. No.: 12/437,404

(22) Filed: May 7, 2009

(65) Prior Publication Data

US 2010/0287266 A1    Nov. 11, 2010

(51) Int. Cl.
| G06F 15/16 | (2006.01) |
| H04L 12/715 | (2013.01) |
| H04L 12/24 | (2006.01) |
| H04L 12/46 | (2006.01) |
| H04L 29/12 | (2006.01) |

(52) U.S. Cl.
CPC ............ *H04L 45/04* (2013.01); *H04L 41/0806* (2013.01); *H04L 41/0886* (2013.01); *H04L 12/4641* (2013.01); *H04L 61/2015* (2013.01)
USPC ........... 709/230; 709/220; 709/221; 709/222; 709/237

(58) Field of Classification Search
CPC ..................... H04L 41/0806; H04L 41/0886
USPC .................... 709/220, 221, 222, 230, 237
See application file for complete search history.

(56) References Cited

U.S. PATENT DOCUMENTS

| 6,876,667 | B1* | 4/2005 | Synnestvedt et al. ......... 370/466 |
| 7,139,818 | B1* | 11/2006 | Kinnear et al. ............... 709/222 |
| 7,152,117 | B1* | 12/2006 | Stapp et al. ................... 709/245 |
| 7,337,224 | B1* | 2/2008 | Van Horne et al. ........... 709/225 |
| 7,373,397 | B2* | 5/2008 | Johnson et al. ............... 709/220 |
| 7,586,912 | B2* | 9/2009 | Agarwal et al. ............... 370/389 |
| 7,882,169 | B1* | 2/2011 | Droms et al. ................. 709/203 |
| 2003/0187997 | A1* | 10/2003 | Alexis ........................... 709/229 |
| 2005/0044265 | A1* | 2/2005 | Vinel et al. .................... 709/238 |
| 2005/0131997 | A1* | 6/2005 | Lewis et al. ................... 709/203 |
| 2005/0198218 | A1* | 9/2005 | Tasker et al. .................. 709/220 |
| 2005/0252970 | A1* | 11/2005 | Howarth et al. .............. 235/451 |
| 2005/0253722 | A1* | 11/2005 | Droms et al. ............... 340/572.1 |
| 2007/0101121 | A1* | 5/2007 | Henry et al. .................. 713/151 |
| 2007/0174435 | A1* | 7/2007 | Piercy et al. .................. 709/220 |
| 2007/0180142 | A1* | 8/2007 | Small et al. ................... 709/245 |
| 2007/0203999 | A1* | 8/2007 | Townsley et al. ............. 709/207 |
| 2007/0280212 | A1* | 12/2007 | Chen et al. .................... 370/356 |
| 2008/0043933 | A1* | 2/2008 | Pinault et al. .................. 379/45 |
| 2008/0087730 | A1* | 4/2008 | Howarth et al. .............. 235/435 |
| 2008/0151906 | A1* | 6/2008 | Kolli et al. ............... 370/395.31 |
| 2008/0212598 | A1* | 9/2008 | Kolli et al. .................... 370/409 |
| 2008/0247379 | A1* | 10/2008 | Belanger et al. .............. 370/351 |

(Continued)

*Primary Examiner* — Hieu Hoang

(74) *Attorney, Agent, or Firm* — Hickman Palermo Truong Becker Bingham Wong LLP

(57) ABSTRACT

In an embodiment, an electronic digital data packet router performs receiving a DHCP initiation message on a particular interface among a plurality of network interfaces,; modifying the DHCP initiation message by adding a particular DHCP option that signals a DHCP server to provide router configuration data, resulting in a modified DHCP initiation message; relaying the modified DHCP initiation message to the DHCP server; receiving, from the DHCP server, a DHCPOFFER message that comprises the particular DHCP option containing configuration data; configuring the router using the configuration data; relaying the DHCPOFFER message without the particular DHCP option on the particular interface toward another data packet router.

24 Claims, 4 Drawing Sheets

(56) References Cited

U.S. PATENT DOCUMENTS

| | | |
|---|---|---|
| 2008/0294755 A1* | 11/2008 | Melsen et al. ............... 709/220 |
| 2009/0073937 A1* | 3/2009 | Xia et al. ..................... 370/331 |
| 2009/0132696 A1* | 5/2009 | Cankaya et al. ............. 709/224 |
| 2009/0205024 A1* | 8/2009 | Kokot et al. ..................... 726/5 |
| 2009/0210518 A1* | 8/2009 | Verma et al. ................. 709/220 |
| 2010/0043041 A1* | 2/2010 | Ford et al. .................... 725/111 |
| 2010/0085958 A1* | 4/2010 | Veenstra et al. ............. 370/352 |
| 2010/0182910 A1* | 7/2010 | Norefors et al. ............. 370/241 |
| 2010/0202462 A1* | 8/2010 | Riddel et al. ................ 370/400 |
| 2010/0274924 A1* | 10/2010 | Allan et al. ................... 709/245 |
| 2010/0299414 A1* | 11/2010 | Nyman ......................... 709/220 |
| 2010/0312818 A1* | 12/2010 | Oman ........................... 709/202 |
| 2011/0307588 A1* | 12/2011 | Thyni et al. .................. 709/222 |

* cited by examiner

AUTOMATED NETWORK DEVICE PROVISIONING USING DYNAMIC HOST CONFIGURATION PROTOCOL

TECHNICAL FIELD

The present invention relates to network management.

BACKGROUND

Network service providers including incumbent local exchange carriers (ILEC), competitive local exchange carriers (CLECs), cable operators, managed service operators, and others who offer managed internet protocol (IP) virtual private network (VPN) service wish to achieve network provisioning solutions that provide "zero-touch" or automatic configuration of VPN devices, such as customer edge (CE) routers and provider edge (PE) routers. In a zero-touch provisioning approach, when a CE router is powered on and establishes a communications link to a PE router, the CE router is able to communicate with remote CE routers and become part of an any-to-any VPN.

Existing mechanisms for zero-touch CE provisioning assume that the CE router has working internet protocol (IP) reachability to the zero-touch provisioning server, for purposes of downloading CE configuration files. These mechanisms also assume that the PE router is already configured with a PE-CE interface IP address, VRF data values, the PE-CE routing protocol, MP-BGP VRF instance, and other configuration values that are essential to support IP reachability.

In current practice, manual steps are required to accomplish configuration of PE routers with these values. Alternatively, service providers can use a configuration tool such as Internet Service Center (ISC), commercially available from Cisco Systems, Inc., San Jose, Calif., but this approach requires the administrator to manually identify routers and values, perform multiple steps and consequently extensive knowledge about how to use the tool is necessary. Manual configuration is inefficient, time-consuming, costly and involves potential human error.

The assumptions and manual identification steps described above pose significant limitations for the effective deployment of managed service with zero-touch CE routers.

Certain service providers have attempted to address the problem using flow-through provisioning, but this approach is limited by the foregoing assumptions, and becomes handicapped when automatic PE provisioning is desired. The time involved in performing CE-PE router provisioning is a serious barrier to achieving automated VPN service activation.

Cisco Configuration Engine (CCE), commercially available from Cisco Systems, Inc., San Jose, Calif., facilitates provisioning CE routers. However, CCE requires a CE router to have IP reachability to the CCE server, which may be within in or outside the SP network. Moreover, CCE assumes that the PE router is already configured to provide IP connectivity to the CE router; this assumption is invalid in many deployments. Cisco also offers an auto-install feature for router configuration.

Dynamic Host Configuration Protocol (DHCP), as defined in Request for Comments (RFC) 2131 and RFC 3315 of the Internet Engineering Task Force, provides techniques for configuring network addresses (IP addresses) on IP devices. The Data Over Cable Service Interface Specification (DOCSIS) uses DHCP at a cable modem to obtain IP addresses of various servers including a TFTP server. The cable modem then unicasts a request to the TFTP server to download a configuration file. However, both the DOCSIS approach and the Cisco approaches discussed above have the assumptions and issues described above.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

In an embodiment, a data packet router comprises a plurality of network interfaces; one or more processors coupled to the network interfaces; dynamic host configuration protocol (DHCP) relay agent logic coupled to the one or more processors, and the logic is configured to perform upon execution: receiving a DHCP initiation message on a particular interface among the plurality of network interfaces, and the particular interface lacks virtual private network (VPN) configuration data; modifying the DHCP initiation message by adding a particular DHCP option that signals a DHCP server to provide router VPN configuration data, resulting in a modified DHCP initiation message; relaying the modified DHCP initiation message to the DHCP server; receiving, from the DHCP server, a DHCP response message that comprises the particular DHCP option carrying one or more VPN configuration values; relaying the DHCP response message without the particular first DHCP option on the particular interface toward another router.

In an embodiment, the logic upon execution is configured to perform configuring the router based on the VPN configuration values.

In an embodiment, the DHCP initiation message comprises any of a DHCPDISCOVER message, a DHCPREQUEST message, and a DHCPINFORM message and wherein the DHCP response message comprises any of a DHCPACK message and a DHCPOFFER message.

In an embodiment, the VPN configuration values comprise provider edge (PE) router configuration values, and the logic upon execution is configured to perform removing the PE configuration values from the DHCP response message, configuring the particular interface based on the removed PE configuration values, and relaying the DHCP response message on the particular interface with or without the CE configuration values, if requested by the CE router. In an embodiment, the PE configuration values comprise configuration data for VRF, a network address for the particular interface that connects the router to a CE router, and routing protocol instance configuration data.

In an embodiment, the logic upon execution is configured to perform: creating and storing, in memory of the router, a binding that associates (a) a unique identifier of a customer edge (CE) router that sent the DHCP initiation message to (b) an index value identifying the particular interface; relaying the DHCP response message on the particular interface by using the index value to select the particular interface.

In an embodiment, the logic upon execution is configured to perform modifying the DHCP initiation message by providing one or more values in the first particular DHCP option value that signals the DHCP server to provide only specified PE router VPN configuration data, resulting in a second modified DHCP initiation message; relaying the second modified DHCP initiation message to the DHCP server; receiving, from the DHCP server, a second DHCP response message that comprises the first particular DHCP option value and only the specified PE router VPN configuration values; applying the configuration to instantiate the VPN on the router (through the global configuration, interface configuration, protocol configuration etc.) using the specified PE router VPN configuration values. In an embodiment, the logic upon execution is configured to perform modifying the DHCP initiation message by adding specified PE router VPN configuration data and a third particular DHCP option value that signals the DHCP server to validate the specified PE router VPN configuration data, resulting in a third modified DHCP initiation message; relaying the second modified DHCP initiation message to the DHCP server; receiving, from the DHCP server, a third DHCP response message that comprises the third particular DHCP option value and information indicating that the specified PE router VPN configuration data is valid.

In an embodiment, the logic upon execution is configured to perform receiving, from the DHCP server, a third DHCP response message that comprises the third particular DHCP option value, information indicating that the specified PE router VPN configuration data is invalid, and one or more new PE router configuration data; in response to the information indicating that the specified PE router VPN configuration data is invalid, configuring the particular interface of the router using the new PE router VPN configuration values.

In an embodiment, a computer-readable data storage medium stores one or more sequences of instructions which when executed cause one or more processors to perform the functions described above. In an embodiment, in a data processing method, a packet router performs steps based on the functions described above.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In an embodiment, a data packet router, computer-readable storage medium, and data processing method implement an approach that can support fully automated service activation in which a provider edge (PE) router automatically configures itself when a customer edge (CE) router initiates operation and establishes a PE-CE link. In an embodiment, Dynamic Host Configuration protocol (DHCP) option extensions, processing extensions and relay agent operational extensions support the approach. In one approach, PE router auto-provisioning may be achieved. Additionally or alternatively, CE auto-provisioning is supported.

1.0 Structural Overview

Figure 1:
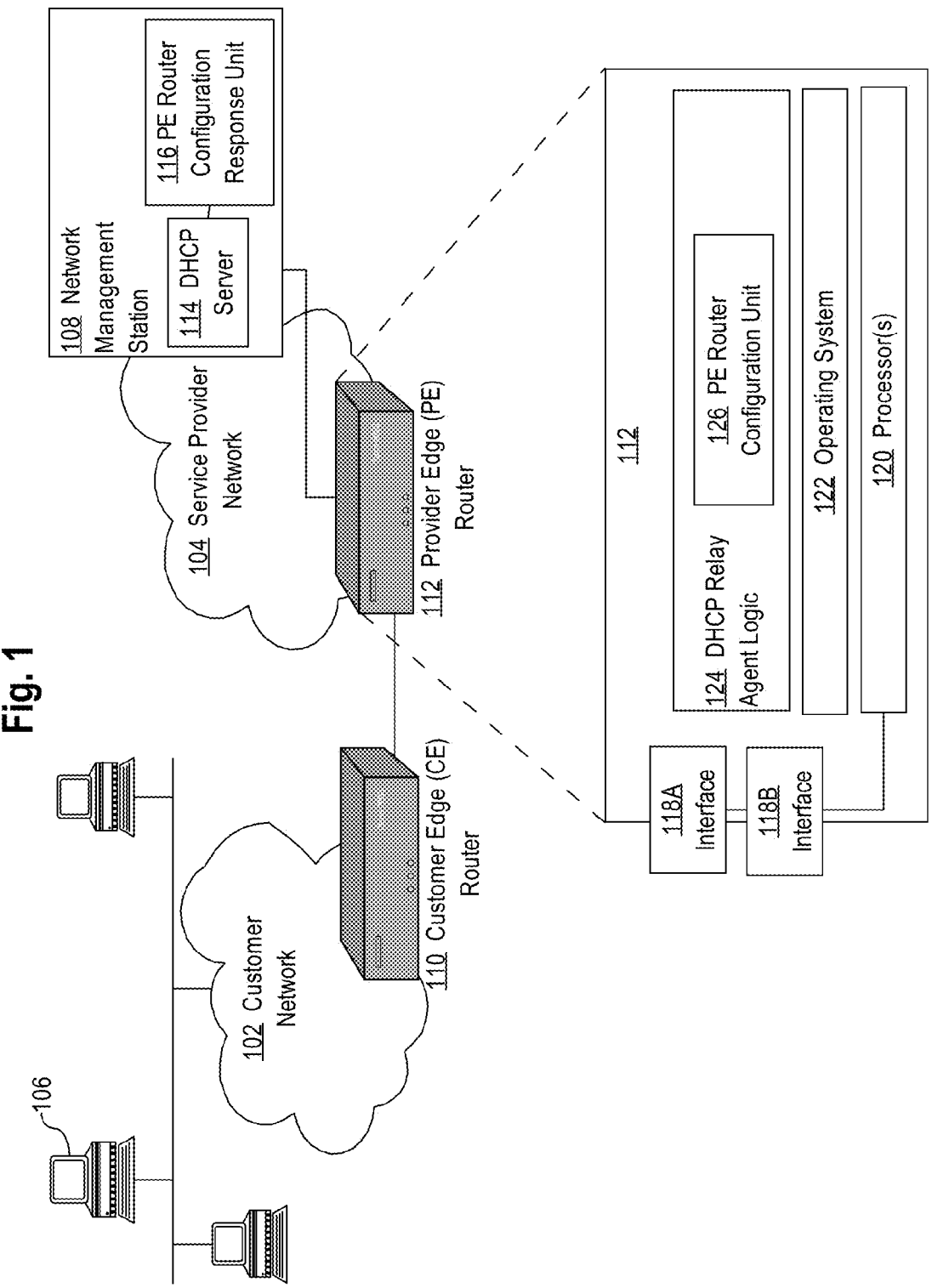
FIG. 1 illustrates an example network context in which embodiments may be used.

FIG. 1 illustrates an example network context in which embodiments may be used. In an embodiment, a customer network 102 comprises, includes or is coupled to a plurality of network end stations 106 such as personal computers, workstations, printers, servers, storage systems, or other computers or peripherals. The customer network 102 comprises one or more customer edge (CE) routers 110 that are coupled directly or indirectly through one or more internetworks to a provider edge (PE) router 112 of a service provider network 104.

In this context, the terms "customer" and "service provider" indicate that network 102 is owned or operated by an entity that has a customer relationship to a service provider that owns or operates network 104. For example, the service provider network 104 may be owned or operated by a network service provider that provides IP/MPLS VPN services or other networking services to the entity associated with customer network 102. However, in other embodiments the arrangement of FIG. 1 may involve entities that do not have a customer-service provider relationship and the techniques described herein are broadly applicable to any networking system in which automatic provisioning is desired. For example, each of networks 102, 104 may comprise an autonomous system (AS) or networking domain of the same entity or different entities.

In an embodiment, each of the routers 110, 112 is an electronic digital packet router such as model 2600 or 7200 from Cisco Systems, Inc., San Jose, Calif. In other embodiments, routers 110, 112 may comprise other networking devices such as other kinds of routers, switches, gateways, and access devices.

In an embodiment, service provider network 104 further comprises a network management station 108 that comprises a dynamic host configuration protocol (DHCP) server 114 coupled to or including a PE router configuration response unit 116 (and optionally a CE router configuration response unit 117). In other embodiments, server 114 and unit 116 may be hosted in router 112 or in other networking elements in network 104; thus, a network management station 108 is not required.

The DHCP server 114 comprises one or more logical functional elements, implemented using any combination of computer programs, other software elements, firmware, programmed digital circuits such as ASICs or FPGAs, or other hardware elements and configured to implement the DHCP as specified in RFC 1541, RFC 2131 and RFC3315. DHCP is the predominant signaling protocol to dynamically assign IP addresses and other TCP/IP parameters to routers and hosts. The PE router configuration response unit 116 comprises one or more logical functional elements, implemented using any combination of computer programs, other software elements, firmware, programmed digital circuits such as ASICs or FPGAs, or other hardware elements and configured to implement the functions that are described further herein in connection with FIG. 2 and FIG. 3. Thus, in one embodiment, network management station 108 comprises a special-purpose computer having the particular logical functions described herein for unit 116, FIG. 2 and FIG. 3. The CE router configuration response unit 117 may also be present.

In an embodiment, PE router 112 comprises a plurality of network interfaces 118A, 118B, each of which is configured to be coupled to network links, internetworks and indirectly to CE router 110 or other links, networks and networking devices. PE router 112 comprises one or more hardware processors 120, an operating system 122, and DHCP relay agent logic 124 comprising a PE router configuration unit 126.

The one or more hardware processors 120 comprise one or more central processing units, processor cores, or microcontrollers, coupled to support circuitry such as floating-point processors, I/O controllers, switching systems, and other processing hardware. Operating system 122 comprises one or more computer programs, other software elements, or firmware that implement basic input/output functions, a networking stack, and program hosting and supervision functions. An example of operating system 122 is Cisco IOS Software®, commercially available from Cisco Systems, Inc., San Jose, Calif.

The DHCP relay agent logic 124 comprises one or more logical functional elements, implemented using any combination of computer programs, other software elements, firmware, programmed digital circuits such as ASICs or FPGAs, or other hardware elements and configured to implement DHCP relay agent functions as specified in RFC 1541, RFC 2131 and RFC3315.

Figure 2:
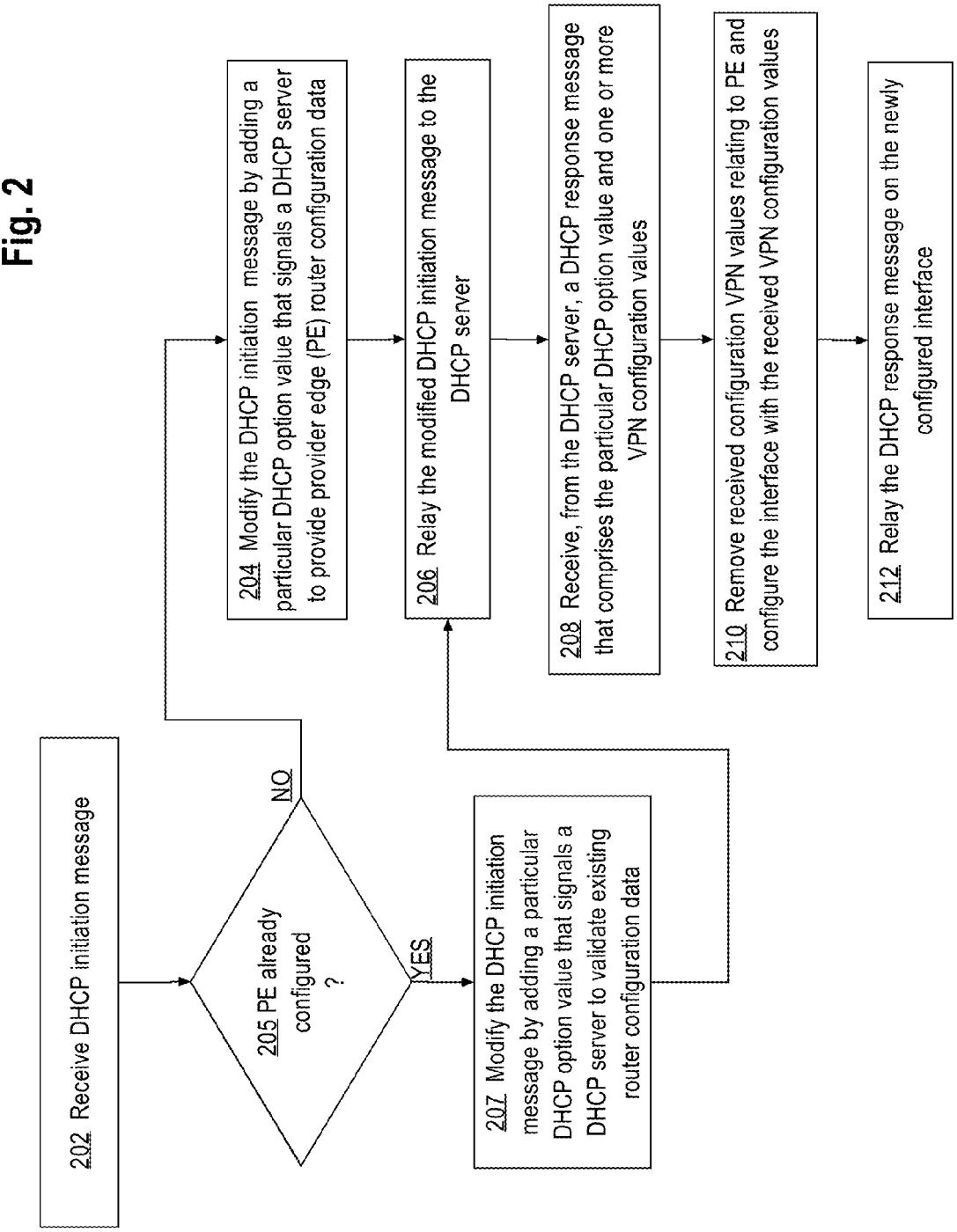
FIG. 2 illustrates a method.
Figure 3:
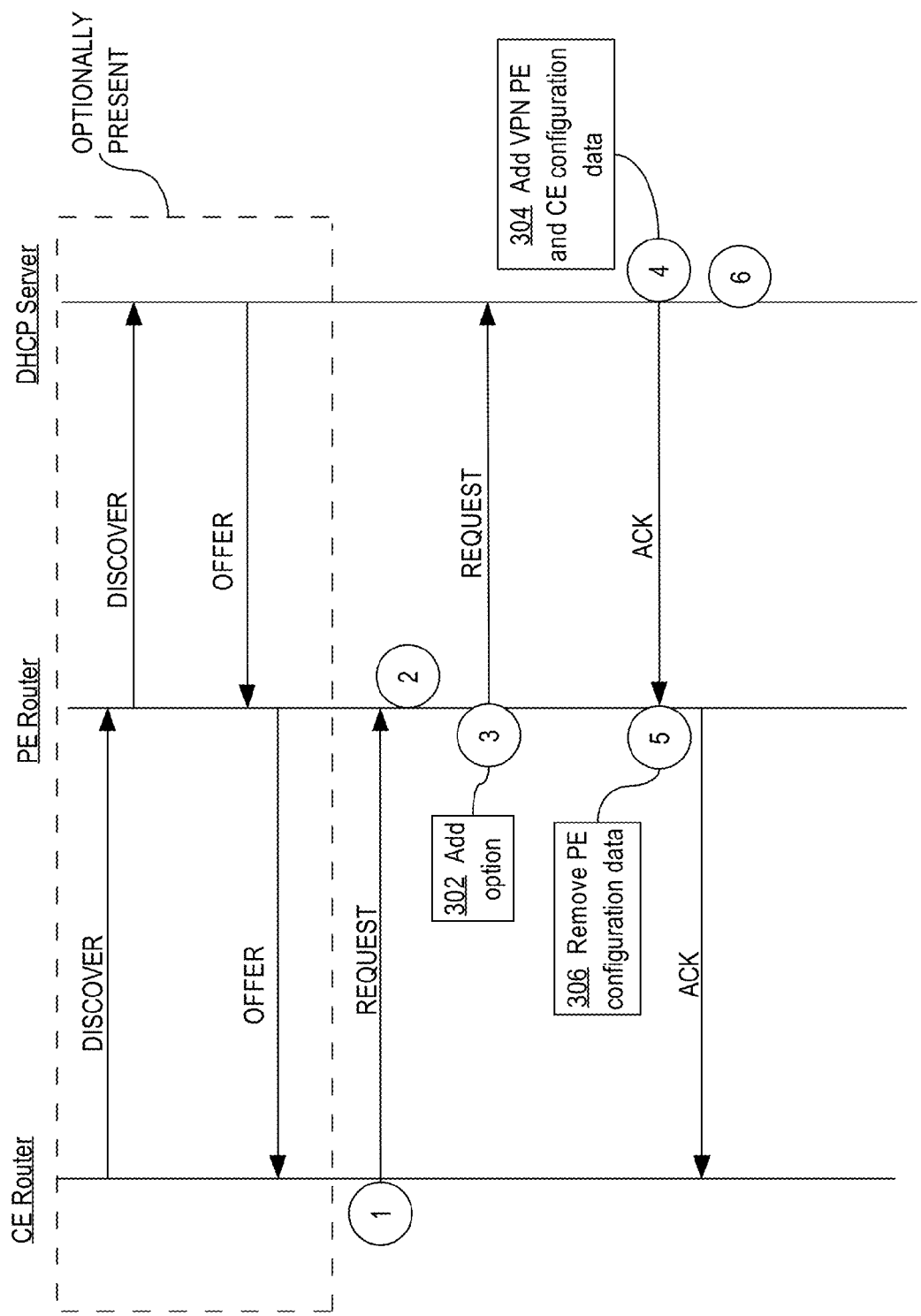
FIG. 3 illustrates a message ladder.

The PE router configuration unit 126 comprises one or more logical functional elements, implemented using any combination of computer programs, other software elements, firmware, programmed digital circuits such as ASICs or FPGAs, or other hardware elements and configured to implement certain functions that are described further herein in connection with FIG. 2 and FIG. 3. Thus, in one embodiment, PE router 112 comprises a special-purpose computer having certain logical functions as described herein for unit 126, FIG. 2 and FIG. 3.

2.0 Functional Overview

In an embodiment, DHCP comprises a signaling protocol for auto-provisioning of the PE router 112 and optionally the CE router 110. The techniques herein can be used to establish BGP-based or MPLS-based IP virtual private network (VPN) service as specified in IETF RFC 4364. Auto-provisioning as provided herein may be used to activate a managed VPN service without requiring manual configuration or manual contact with the routers. In various other embodiments, services other than MPLS/BGP VPN could be configured using this approach. More broadly, any IP network that utilizes DHCP as a means to allocate IP addresses to clients can use the approaches herein. For example, hosts on a LAN connect to a new interface of the router and use DHCP for router provisioning. Another example is conventional IP internet service from an ISP to an Enterprise in which the ISP router is configured using DHCP initiated by the enterprise router. Unlike past DHCP approaches, the DHCP relay agent logic 124 as described herein comprises modifications that permit the relay agent to request configuration information for itself and related devices.

FIG. 2 illustrates a method; FIG. 3 illustrates a message ladder. For purposes of illustrating a clear example, the description of FIG. 2, FIG. 3 refers to the context of FIG. 1, but the approaches of FIG. 2, FIG. 3 may be applied to other embodiments and contexts. Further, to provide a clear example, the description of FIG. 2, FIG. 3 refers to provisioning a VPN service, but other embodiments may use the same general techniques herein to accomplish configuration of any other networking service, feature or function. Thus, the broad approach of the disclosure is not limited to configuring routers for MPLS VPNs.

Referring first to FIG. 2, which describes functions that may be implemented in PE router 112 using PE router configuration unit 126, in step 202, a DHCP initiation message is received. The message may be received on an interface that may or may not lack virtual private network (VPN) configuration data or lacks other configuration data. In various embodiments, the DHCP initiation message may comprise a DHCPDISCOVER message, a DHCPREQUEST message or a DHCPINFORM message, and may include a unique identifier value of the sender, such as a MAC address, UDI or serial number of the CE router 110.

In an embodiment, the CE router 110 is programmed to broadcast the DHCP initiation message, using DHCP client logic, just after Layer 2 connectivity is established on either all or one or more designated interfaces. As a result, the DHCP initiation message will reach the PE router 112 through one of the interfaces. If the CE router 110 has more than one interface that has Layer 2 connectivity, the CE router may broadcast a DHCPDISCOVER message on any interface that has no IP address, or all of them. Under operation of DHCP, the message will eventually arrive at one PE router that is listening for DHCP messages, and the CE router 110 will eventually receive a response.

Embodiments are operable even when the CE router 110 has been manually configured with an IP address, or when the CE router is configured to obtain an IP address from a local DHCP server in the customer network 102. In this case, the CE router 110 uses the DHCPINFORM message to communicate the address to the DHCP server 114, and the automatic configuration process herein proceeds as if the CE router had used a DHCPDISCOVER or DHCPREQUEST.

The PE router 112 receives the DHCP initiation on a Layer 2 interface, such as interface 118A, which is not yet configured with an IP address or other parameters relating to VPN service or other networking services for the CE router 110. Optionally, to facilitate sending relayed responses to the correct CE device, at step 202 the PE router may create and store a binding that maps the unique identifier of the sending CE router (or the Layer 2 address e.g. MAC address of the interface on which the DHCP initiation message is received) to an index value that identifies the interface on which the DHCP initiation message was received. The binding is useful because the interface may not be configured yet.

Logic in the PE router 112 is configured to relay the received DHCP initiation to the DHCP server 114 after appending a specified DHCP option. In an embodiment, at step 205, the PE router configuration unit 126 may test whether the interface on which the DHCP initiation message is received, already has an IP address or other configuration data and is thus already configured to provide IP connectivity or VPN service to the CE router 110. If such data is present, then in step 207 the PE router configuration unit 126 may modify the received DHCP initiation message to include the PE router's current configuration data, and to add an option that triggers the DHCP server 114 to validate the current configuration data. The PE router configuration unit 126 also may set values in a DHCP option to request only particular configuration values or a subset of all available configuration values.

If the interface is not yet configured, then the test of step 205 is negative and as shown in step 204, the DHCP initiation message is modified by adding a particular DHCP option that signals a DHCP server to provide PE router configuration data to instantiate the VPN on the PE router. The PE router 112 also may insert a globally reachable address for the gateway interface address (giaddr) value in the relayed request; for example, the PE router 112 may use its loopback IP address that is well inside the SP network.

The particular value of the DHCP option is not critical, and a new DHCP option (a relay agent configuration option, for example) may be defined for purposes of an embodiment. The relay agent information option as defined by RFC 3046 is specified to be returned by the DHCP server verbatim, and therefore an option other than the relay agent information option should be used.

In step 206, the modified DHCP initiation message is relayed to the DHCP server. For example, cooperative action of the PE router configuration unit 126 and DHCP relay agent logic 124 of PE router 112 relays the modified DHCP initiation message to DHCP server 114.

The DHCP server 114 examines the specified DHCP option in the DHCP initiation message. DHCP Server 114 parses the relay agent configuration option among other options and sends a message containing the CE's unique identifier to the PE router configuration response unit 116 and optionally to the CE router configuration response unit 117. The DHCP server 114 may also poll other units for other purposes. The DHCP server expects to receive the PE configuration data and optionally CE configuration data from units 116, 117 respectively. The DHCP server 114 then constructs the DHCP response message including the PE configuration data in the relay agent configuration option, other configuration information, and CE configuration data. The DHCP server 114 then forwards the DHCP response message to the PE router 112.

In step 208, a DHCP response message is received from the DHCP server, and the message comprises both the particular DHCP option and one or more VPN configuration values. In an embodiment, in the DHCP response message the DHCP server 114 includes one or more PE configuration data as part of the specified option, or one or more sub-options. The DHCP response message may also include the CE configuration data separate from the PE configuration data. Functions of the DHCP server 114 described herein may be implemented using PE router configuration response unit 116.

The configuration data may include a complete set of configuration data appropriate to configure the PE router, and optionally also the CE router, for a Layer 3 networking service such as MPLS VPN service, BGP VPN service, or other service. Thus, in an embodiment, the configuration data that the PE requests, and that the DHCP server provides, is not merely a network address but may be a complete configuration data set. Further, the data may include both PE configuration data and CE configuration data in the single DHCP message, so that separate tools, messages or transactions are unnecessary to achieve configuration of both the PE router and the CE router relatively concurrently and triggered by achieving Layer 2 connectivity of the CE router to the PE router.

In an embodiment, the DHCP server 114 or unit 116 may poll other servers present in the network management station 108 to obtain the PE configuration data. For example, an authentication, authorization and accounting (AAA) server or a policy server may be used to obtain various values.

In an embodiment, under RFC4364, the PE configuration data comprises an IP address value and subnet value for the PE-CE interface, which values may be based on policy data or address pools managed by a server in the network management station 108; VRF configuration values such as Route-Distinguisher (RD), and Route-Target (RT); other PE-CE interface configuration (description, VRF to interface mapping, etc.); the routing protocol configuration including neighbor IP address and ASN information if BGP or EIGRP is in use; security, IP SLA and QoS information for the VPN.

In an embodiment, the unit 116 or DHCP server 114 may select VRF-specific PE configuration data values based on the MAC address, unique device identifier (UDI) or serial number of the CE router 110; in other embodiments, other policy data may be used to guide the selection of values. In an embodiment, such unique identifying values for CE router 110 are typically already configured in a mapping in the network management station 108 or one of its servers that identifies values for routers that are known to belong to a particular VPN customer. In yet another embodiment, the DHCP option may indicate that the server should return only a subset of all available configuration values or return only particular requested configuration values. Some or all of the foregoing information may be encoded in one or more type-length-value (TLV) tuples associated with the specified DHCP option or sub-options.

In an embodiment, if the VRF configuration provided in a response from the DHCP server 114 is already present at the PE router 112, then the PE router configuration unit 126 may compare the existing configuration with the offered configuration. If a mismatch is determined, the PE router 112 may log an error message or generate an event or notification to the DHCP server 114, to other elements of the network management station 108, or both. An error could occur, for example, if a new CE router having a different unique identifier value appears in the same VPN that previously used a different CE router. In an embodiment, the PE router 112 applies the offered configuration when a mismatch is determined, but the error message or event identifies the mismatch. A DHCP sub-option may be defined for this purpose.

In step 210, the received configuration VPN values relating to the PE router are removed, and the interface referenced in step 202 is configured using the received VPN configuration values. For example, PE router configuration unit 126 extracts PE-specific configuration values from the response message and uses the values to configure interface 118A to provide MPLS VPN or BGP VPN service to CE router 110.

In step 212, the DHCP response message is relayed to the CE router on the newly configured interface. In an embodiment, the PE router configuration unit 126 removes the PE-specific configuration data from the response received from the DHCP server 114. The PE router configuration unit 126 then forwards the remaining response with zero or more CE configuration data values to the CE router 110, which can extract CE configuration data from the response and configure the CE router using the configuration data for the CE router, if present.

FIG. 3 illustrates an embodiment of the foregoing process in the context of a complete DHCP message flow or transaction. A CE router, such as CE router 110, sends a DHCPREQUEST message into a network at operation (1), and the message is received at a PE router such as PE router 112 at (2).

In an embodiment, operation (1) may be preceded by the CE router 110 testing whether it already has an IP address or other configuration data; the presence of such data may indicate that the CE router already completed subsequent operations of FIG. 3 and has rebooted thereafter. If such data is present, then the remaining operations described below may be skipped.

At step 302, the PE router adds a specified option that signals the DHCP server to provide configuration data. At (3), the PE router relays the modified DHCPREQUEST message to the DHCP server.

At operation (3), logic in PE router configuration unit 126 of the PE router 112 tests whether the PE router is already configured with VPN configuration data. If so, then the modification of DHCP message at step 302 may be skipped, and the DHCPREQUEST message may be relayed without modification. However, if the result of such a test is negative, then the modification of the DHCP message at step 302 will be performed.

At step 304, the DHCP server processes the DHCPREQUEST message and creates a response message in which it adds PE configuration data and optionally CE configuration data. At operation (4), the DHCP server sends the response in the form of a DHCPACK message to the PE router. At step 306, the PE router removes the PE-specific configuration data from the DHCPACK message, and uses the data to configure itself. Thus, in an embodiment the PE-specific configuration data is installed in the PE router in response to receiving the DHCPACK message, although the configuration data can be carried in a relay agent configuration option in any DHCP message relevant to relay agent functions.

At (5), the PE router relays the DHCPACK message, without PE-specific configuration data but including zero or more CE-specific configuration data values, to the CE router.

Optionally the operations just described may be preceded by an exchange of DHCPDISCOVER and DHCPOFFER messages in which the CE router may request an IP address or other configuration data by sending a DHCPDISCOVER message, which the PE router relays to the DHCP server without modification. The DHCP server replies with a DHCPOFFER containing an offered lease of a network address, which the PE router also relays without modification.

Further, the operations just described may be integrated into the exchange of DHCPDISCOVER and DHCPOFFER messages rather than in an exchange of DHCPREQUEST and DHCPACK messages. REQUEST and ACK messages are normally required in a DHCP message exchange whereas the use of DISCOVER as a first message will vary from host to host. Hosts typically consider the ACK message authoritative as the information in the ACK may be different than information in a prior OFFER if an OFFER was used.

At operation (6), optionally the network management station 108 or its servers may store the mapping of the CE router unique identifier and IP address for tracking in other operations.

Operations (1) and (4) may be used to perform verification of configuration data that is already stored in the CE router. For example, the CE router may reboot and determine upon rebooting that certain MPLS VPN configuration data is already stored in NV-RAM or other storage of the CE router. Using a DHCPREQUEST message and the techniques herein, at operation (1) the CE router 110 can request the DHCP server 114 to verify the correctness of the stored data. If the stored data is incorrect, the DHCP server 114 can respond with a negative acknowledgement (DHCPACK) that includes the specified option value and substitute CE router configuration data; in response, the CE router accepts and applies the substitute data.

To provide improved provisioning security, in an embodiment, a service provider may assign the PE-CE interfaces 118A, 118B to a special VPN instance prior to starting the process of FIG. 2, FIG. 3. This ensures that the CE router 110 cannot accidentally obtain global reachability to the service provider network. The special VPN is meant to only facilitate the DHCP message exchange between the CE and DHCP server through the PE router, and is replaced with a customer-specific VPN after the successful DHCP messages exchange.

Security also can be enhanced by providing the CE router 110 with a data item or cookie that the CE router must also encode within the DHCP initiation message, to prove that the CE router is authorized to request configuration data. In this embodiment, the PE router configuration unit 126 is configured to identify both the data item (or cookie) and a unique identifier of the CE router 110 in the DHCP initiation message. If one is missing, then the PE router configuration unit 126 is configured to cause the PE router 112 not to relay or respond. Additionally or alternatively, DHCP authentication as defined in RFC 3118 may be used, and/or the systems may be configured with the DHCP relay authentication sub-option as described in RFC 4030.

To circumvent the potential for misuse of a device serial number or MAC address, which may be printed on a shipping carton of the CE router 110 and subject to use by unauthorized parties to obtain configuration data improperly, an embodiment may use an identifier that is derived from the serial number, MAC or UDI based on a private algorithm that is embedded in the DHCP logic of the CE router and in PE router configuration unit 126.

Thus, the disclosure herein has described the use of DHCP with specified or new DHCP option(s) to request, obtain and provide configuration information to a PE router and optionally to a CE router in response to a DHCP request from the CE router, as determined by the CE router and the PE router relay agent through which the CE router communicates with the DHCP server. Certain embodiments offer the benefit of improving managed service activation time, and provide an approach with scalability and efficiency so that an embodiment is expected to be able to automatically provision many thousands of CE routers and PE routers. Embodiments may be used to eliminate manual configuration, which is expensive and error-prone when applied to deployments of thousands of devices. Embodiments are applicable to any routing platform running DHCP.

Unlike past approaches in which configuration of a CE router and PE router may be performed separately and independently without coordination, the present approach can trigger PE router configuration when required in response to the availability of CE connectivity. Thus, a dynamic PE router provisioning approach is provided that ensures that a CE router can obtain networking (VPN) service that would otherwise be unavailable even if the CE router succeeded in obtaining an IP address. The PE router may be provisioned independent of the address lease time for the DHCP relay agent in the PE router. In sharp contrast to prior approaches, in the present approach the configuration of PE router having a DHCP relay agent may occur during interaction of a client CE router and a DHCP server.

The present approach greatly improves the flexibility of router deployments and reduces the time required to configure a CE router for service. For example, an embodiment can be used to achieve "plug-and-play" services for MPLS/VPN networks, as the CE router can be connected to any PE router in a point of presence, and to any port or interface of the PE router, to trigger configuration of the CE router in response to establishing Layer 2 connectivity. Further, a CE router that is using one operating service provider network can be moved to another port or another PE router of an entirely different service provider, and automatically obtain appropriate configuration for that service provider. Embodiments can make such changes transparent to the PE router, since the PE router is re-provisioned dynamically in response to changes in such physical connections.

3.0 Implementation Techniques—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
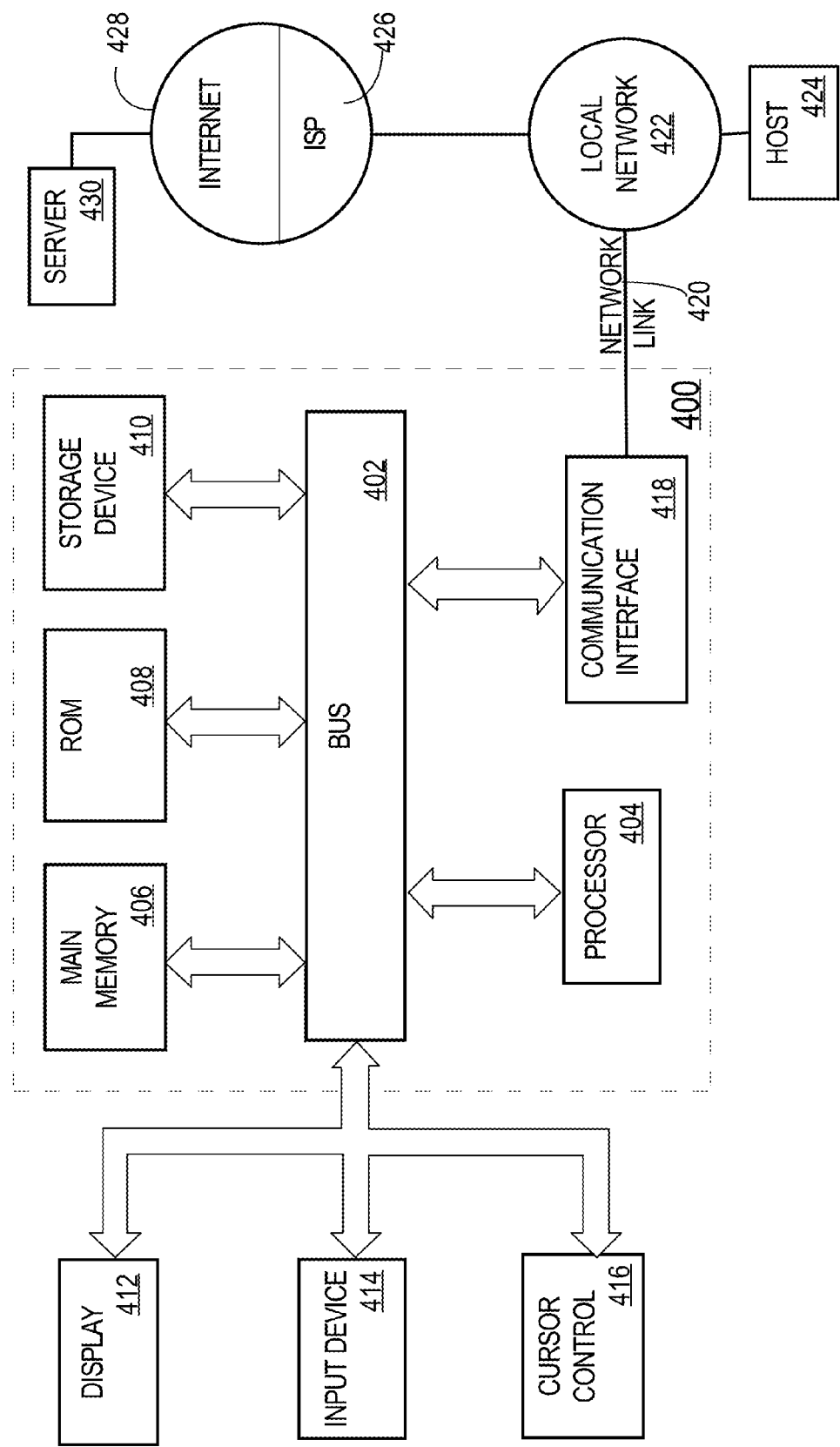
FIG. 4 illustrates an example computer system with which an embodiment may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

4.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A data packet router, comprising:
a plurality of network interfaces;
one or more hardware processors coupled to the network interfaces;
dynamic host configuration protocol (DHCP) relay agent logic coupled to the one or more hardware processors, wherein the logic is configured to perform upon execution:
receiving a DHCP initiation message on a particular interface among the plurality of network interfaces;
modifying the DHCP initiation message by adding a particular first DHCP option other than a relay agent information option that signals a DHCP server to obtain router configuration data and to modify the particular first DHCP option to include the router configuration data, resulting in a modified DHCP initiation message;
relaying the modified DHCP initiation message to the DHCP server;
receiving, from the DHCP server, a DHCP response message that comprises the particular first DHCP option containing configuration data;
relaying the DHCP response message on the particular interface toward another router.

2. The router of claim 1, wherein the logic upon execution is configured to perform configuring the particular interface of the router based on the configuration data.

3. The router of claim 1, wherein the DHCP initiation message comprises any of a DHCPDISCOVER message, a DHCPREQUEST message and a DHCPINFORM message and wherein the DHCP response message comprises any of a DHCPACK message and a DHCPOFFER message.

4. The router of claim 1, wherein the configuration data comprise provider edge (PE) router configuration data, and wherein the logic upon execution is configured to perform removing the first DHCP option containing the PE configuration data from the DHCP response message, configuring the particular interface based on the removed DHCP option containing the PE configuration data, and relaying a remainder of the DHCP response message on the particular interface.

5. The router of claim 4, wherein the PE configuration data comprise configuration data for virtual routing and forwarding (VRF), configuration data for the particular interface that connects the router to another router, routing protocol configuration data, quality of service configuration data, performance and fault measurement data.

6. The router of claim 1, wherein the logic upon execution is configured to perform: creating and storing, in memory of the router, a binding that associates (a) a unique identifier of another router that originated the DHCP initiation message to (b) an index value identifying the particular interface; relaying the DHCP response message on the particular interface by using the index value to select the particular interface.

7. The router of claim 1, wherein the logic upon execution is configured to perform:
modifying the DHCP initiation message by providing one or more values in the first particular DHCP option that signals the DHCP server to provide only specified PE router configuration data, resulting in a second modified DHCP initiation message;
relaying the second modified DHCP initiation message to the DHCP server;
receiving, from the DHCP server, a second DHCP response message that comprises the first particular DHCP option value and only the specified PE router configuration data;
configuring the particular interface of the router using the specified PE router configuration.

8. The router of claim 1, wherein the logic upon execution is configured to perform:
modifying the DHCP initiation message by adding specified PE router configuration data and a third particular DHCP option that signals the DHCP server to validate the specified PE router configuration data, resulting in a second modified DHCP initiation message;
relaying the second modified DHCP initiation message to the DHCP server;
receiving, from the DHCP server, a second DHCP response message that comprises the first particular DHCP option and information indicating that the specified PE router configuration data is valid.

9. The router of claim 8, wherein the logic upon execution is configured to perform:
receiving, from the DHCP server, a third DHCP response message that comprises the first particular DHCP option, information indicating that the specified PE router configuration data is invalid, and one or more new PE router configuration data;
in response to the information indicating that the specified PE router configuration data is invalid, configuring the particular interface of the router using the new PE router configuration data.

10. A non-transitory computer-readable data storage medium storing one or more sequences of instructions which when executed cause one or more hardware processors to perform:
receiving a DHCP initiation message on a particular interface among a plurality of network interfaces;
modifying the DHCP initiation message by adding a particular first DHCP option other than a relay agent information option that signals a DHCP server to obtain router configuration data and to modify the particular first DHCP option to include the router configuration data, resulting in a modified DHCP initiation message;
relaying the modified DHCP initiation message to the DHCP server;
receiving, from the DHCP server, a DHCP response message that comprises the particular first DHCP option containing configuration data;
relaying the DHCP response message on the particular interface toward another router.

11. The storage medium of claim 10, wherein the sequences of instructions upon execution are configured to perform configuring the particular interface of the router based on the configuration data.

12. The storage medium of claim 10, wherein the DHCP initiation message comprises any of a DHCPDISCOVER message, a DHCPREQUEST message and a DHCPINFORM message and wherein the DHCP response message comprises any of a DHCPACK message and a DHCPOFFER message.

13. The storage medium of claim 10, wherein the configuration data comprise provider edge (PE) router configuration data, and wherein the sequences of instructions upon execution are configured to perform removing the first DHCP option containing the PE configuration data from the DHCP response message, configuring the particular interface based on the removed DHCP option containing the PE configuration data, and relaying a remainder of the DHCP response message on the particular interface.

14. The storage medium of claim 13, wherein the PE configuration data comprise configuration data for VRF, configuration data for the particular interface that connects the router to another router, routing protocol configuration data, quality of service configuration data, performance and fault measurement data.

15. The storage medium of claim 10, wherein the sequences of instructions upon execution are configured to perform: creating and storing, in memory of the router, a binding that associates (a) a unique identifier of another router that originated the DHCP initiation message to (b) an index value identifying the particular interface; relaying the DHCP response message on the particular interface by using the index value to select the particular interface.

16. The storage medium of claim 10, wherein the sequences of instructions upon execution are configured to perform:
modifying the DHCP initiation message by providing one or more values in the first particular DHCP option that signals the DHCP server to provide only specified PE router configuration data, resulting in a second modified DHCP initiation message;
relaying the second modified DHCP initiation message to the DHCP server;
receiving, from the DHCP server, a second DHCP response message that comprises the first particular DHCP option value and only the specified PE router configuration data;
configuring the particular interface of the router using the specified PE router configuration values.

17. The storage medium of claim 10, wherein the sequences of instructions upon execution are configured to perform:
modifying the DHCP initiation message by adding specified PE router configuration data and a third particular DHCP option that signals the DHCP server to validate the specified PE router configuration data, resulting in a second modified DHCP initiation message;
relaying the second modified DHCP initiation message to the DHCP server;
receiving, from the DHCP server, a second DHCP response message that comprises the first particular DHCP option and information indicating that the specified PE router configuration data is valid.

18. The storage medium of claim 17, wherein the sequences of instructions upon execution are configured to perform:
receiving, from the DHCP server, a third DHCP response message that comprises the first particular DHCP option, information indicating that the specified PE router configuration data is invalid, and one or more new PE router configuration data;
in response to the information indicating that the specified PE router configuration data is invalid, configuring the particular interface of the router using the new PE router configuration values.

19. A computer-implemented data processing method comprising:
an electronic digital data packet router performing:
receiving a DHCP initiation message on a particular interface among a plurality of network interfaces;
modifying the DHCP initiation message by adding a particular first DHCP option other than a relay agent information option that signals a DHCP server to obtain router configuration data and to modify the particular first DHCP option to include the router configuration data, resulting in a modified DHCP initiation message;
relaying the modified DHCP initiation message to the DHCP server;
receiving, from the DHCP server, a DHCP response message that comprises the particular first DHCP option containing one or more configuration data;
relaying the DHCP response message on the particular interface toward another data packet router.

20. The method of claim 19, wherein the configuration data comprise provider edge (PE) router configuration data, and further comprising removing the first DHCP option containing the PE configuration data from the DHCP response message, configuring the particular interface based on the removed DHCP option containing the PE configuration data, and relaying a remainder of the DHCP response message on the particular interface.

21. The method of claim 19, further comprising modifying the DHCP initiation message by adding providing one or more values in the first particular DHCP option that signals the DHCP server to provide only specified PE router configuration data, resulting in a second modified DHCP initiation message; relaying the second modified DHCP initiation message to the DHCP server; receiving, from the DHCP server, a second DHCP response message that comprises the first particular DHCP option and only the specified PE router configuration data; configuring the particular interface of the router using the specified PE router configuration data.

22. The method of claim 19, further comprising modifying the DHCP initiation message by adding specified PE router configuration data and a third particular DHCP option that signals the DHCP server to validate the specified PE router configuration data, resulting in a second modified DHCP initiation message; relaying the second modified DHCP initiation message to the DHCP server; receiving, from the DHCP server, a second DHCP response message that comprises the third particular DHCP option and information indicating that the specified PE router configuration data is valid.

23. A data packet routing system, comprising:
a router comprising a plurality of network interfaces, one or more hardware processors coupled to the network interfaces, and dynamic host configuration protocol (DHCP) relay agent logic coupled to the one or more hardware processors, wherein the logic is configured to perform upon execution:
receiving a DHCP initiation message on a particular interface among the plurality of network interfaces;
modifying the DHCP initiation message by adding a particular first DHCP option other than a relay agent information option that signals a DHCP server to obtain router configuration data and to modify the particular first DHCP option to include the router configuration data, resulting in a modified DHCP initiation message; relaying the modified DHCP initiation message to the DHCP server;
receiving, from the DHCP server, a DHCP response message that comprises the particular first DHCP option containing configuration data; relaying the DHCP response message on the particular interface toward another router;

a computer comprising one or more second hardware processors and DHCP server logic coupled to the one or more second hardware processors, wherein the DHCP server logic is configured to perform upon execution:
  examining the particular first DHCP option in the DHCP initiation message;
  sending a configuration request message comprising an identifier of the router to a PE router configuration response unit;
  receiving the PE configuration data from the PE router configuration response unit;
  forming the DHCP response message including the PE configuration data in a relay agent configuration option;
  forwarding the DHCP response message to the router.

24. The system of claim 23, wherein the DHCP server logic is further configured to send the configuration request message to a customer edge (CE) router configuration response unit, to receive CE configuration data in response thereto, and to include the CE configuration data in the DHCP response message.

* * * * *